US011325293B2

(12) United States Patent
Ishihama (10) Patent No.: US 11,325,293 B2
(45) Date of Patent: May 10, 2022

(54) INSERT MOLDING AND INSERT MOLDING QUALITY DETERMINATION DEVICE

(71) Applicant: CASIO COMPUTER CO., LTD., Tokyo (JP)

(72) Inventor: Takanori Ishihama, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 613 days.

(21) Appl. No.: 16/150,870

(22) Filed: Oct. 3, 2018

(65) Prior Publication Data

US 2019/0105824 A1    Apr. 11, 2019

(30) Foreign Application Priority Data

Oct. 5, 2017  (JP) .............................. JP2017-194992

(51) Int. Cl.
*B29C 45/76* (2006.01)
*B29C 45/84* (2006.01)
*B29C 45/77* (2006.01)
*B29C 45/78* (2006.01)
*B29C 45/14* (2006.01)
*H01M 10/48* (2006.01)
*H01M 10/42* (2006.01)
*H01M 50/147* (2021.01)
*H01M 50/155* (2021.01)
(Continued)

(52) U.S. Cl.
CPC ...... *B29C 45/768* (2013.01); *B29C 45/14639* (2013.01); *B29C 45/77* (2013.01); *B29C 45/78* (2013.01); *B29C 45/842* (2013.01); *H01M 10/425* (2013.01); *H01M 10/48* (2013.01); *H01M 10/486* (2013.01); *H01M 50/147* (2021.01); *H01M 50/155* (2021.01); *B29C 2945/7604* (2013.01); *B29C 2945/76006* (2013.01); *B29C 2945/76257* (2013.01); *B29C 2945/76294* (2013.01); *B29C 2945/76381* (2013.01); *B29D 99/006* (2013.01); *B29L 2031/3468* (2013.01); *H01M 10/0525* (2013.01); *H01M 2010/4278* (2013.01)

(58) Field of Classification Search
None
See application file for complete search history.

(56) References Cited

U.S. PATENT DOCUMENTS

2013/0056893 A1*  3/2013  Nielsen ................... B29C 45/77
                                                                    264/40.1

FOREIGN PATENT DOCUMENTS

CN    102892566 A    1/2013
JP    S59115826 A    7/1984
(Continued)

OTHER PUBLICATIONS

English translation of JP 2000071303A (Year: 2000).*
(Continued)

*Primary Examiner* — Timothy Kennedy
*Assistant Examiner* — Olukorede Esan
(74) *Attorney, Agent, or Firm* — Holtz, Holtz & Volek PC (57) ABSTRACT

An insert molding includes a lithium-ion battery, temperature measurement element and a pressure measurement element disposed close to the lithium-ion battery to sense temperature and pressure around the lithium-ion battery during insert molding; and a molding resin that covers the lithium-ion battery, the temperature measurement element, the pressure measurement element and a cover member.

8 Claims, 5 Drawing Sheets

(51) Int. Cl.
*B29D 99/00* (2010.01)
*H01M 10/0525* (2010.01)
*B29L 31/34* (2006.01)

(56) References Cited

FOREIGN PATENT DOCUMENTS

| | | | | |
|---|---|---|---|---|
| JP | H01103417 A | | 4/1989 | |
| JP | 04252739 A | | 9/1992 | |
| JP | 2000071303 A | * | 3/2000 | ........... B29C 45/768 |
| JP | 2003132861 A | | 5/2003 | |
| JP | 2003132861 A | | 9/2003 | |
| JP | 2013526436 A | | 6/2013 | |
| JP | 2014172273 A | | 9/2014 | |

OTHER PUBLICATIONS

Japanese Office Action (and English language translation thereof) dated Dec. 17, 2019 issued in Japanese Application No. 2017-194992.

Chinese Office Action (and English language translation thereof) dated May 13, 2021 issued in Chinese Application No. 201811170919.X.

* cited by examiner

INSERT MOLDING AND INSERT MOLDING QUALITY DETERMINATION DEVICE

CROSS-REFERENCE TO RELATED APPLICATION

This application is based upon and claims the benefit of priority from prior Japanese Patent Application No. 2017-194992, filed Oct. 5, 2017, the entire contents of which are incorporated herein by reference.

FIELD

Embodiments described herein relate generally to an insert molding for use in electronic components and the like and an insert molding quality determination device.

BACKGROUND

Technologies to downsize products and simplify manufacturing processes by building electronic components and the like in a resin molding by insert molding have recently been proposed, as disclosed in, for example, Jpn. Pat. Appln. KOKAI Publication No. 4-252739.

SUMMARY

According to an aspect of the invention, an insert molding comprises an insert component, a sensor disposed close to the insert component to sense a state around the insert component during insert molding, and a molding resin that covers the insert component and the sensor.

According to an aspect of the invention, an insert molding quality determination device that determines quality of an insert component after the insert component is resin-molded, the insert molding quality determination device comprises a sensing signal input unit that is supplied with a sensing signal from a sensor disposed close to the insert component to sense a state around the insert component during insert molding, and a first determination unit that determines whether the resin molding is normal or abnormal based on the sensing signal.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
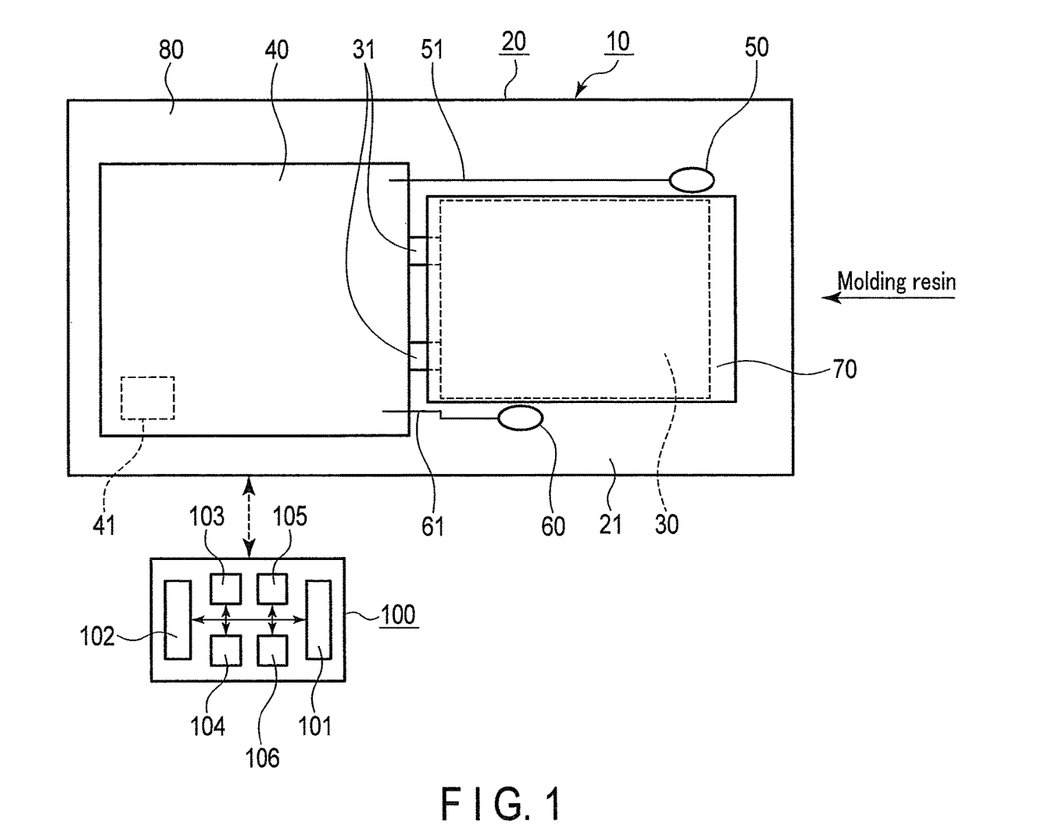
FIG. 1 is a plan view showing an insert molding quality determination system according to a first embodiment and an insert molding excluding a sealing resin.
Figure 2:
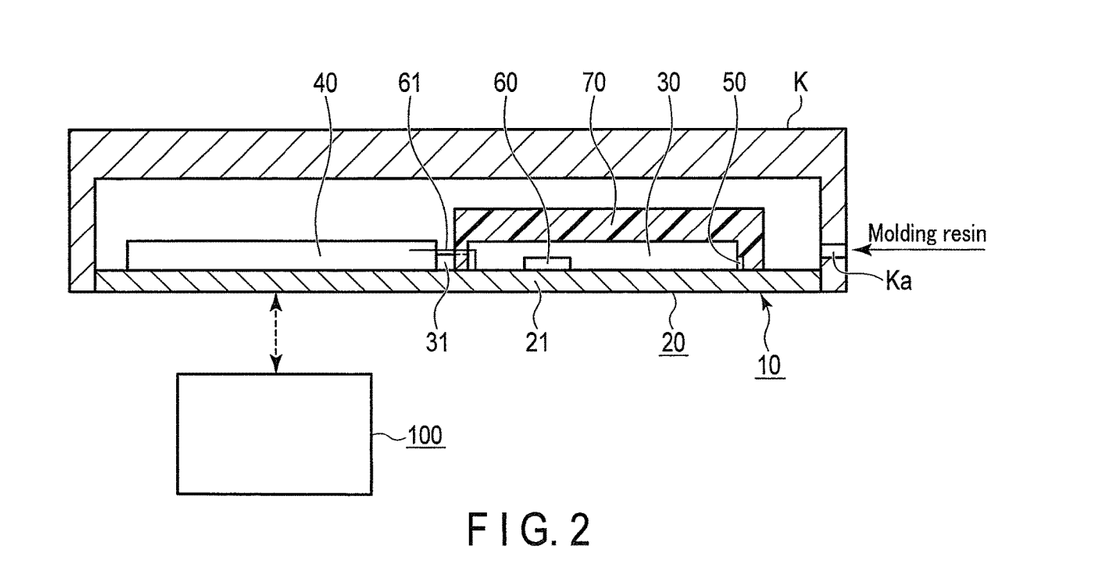
FIG. 2 is an illustration of the insert molding quality determination system and the insert molding.
Figure 3:
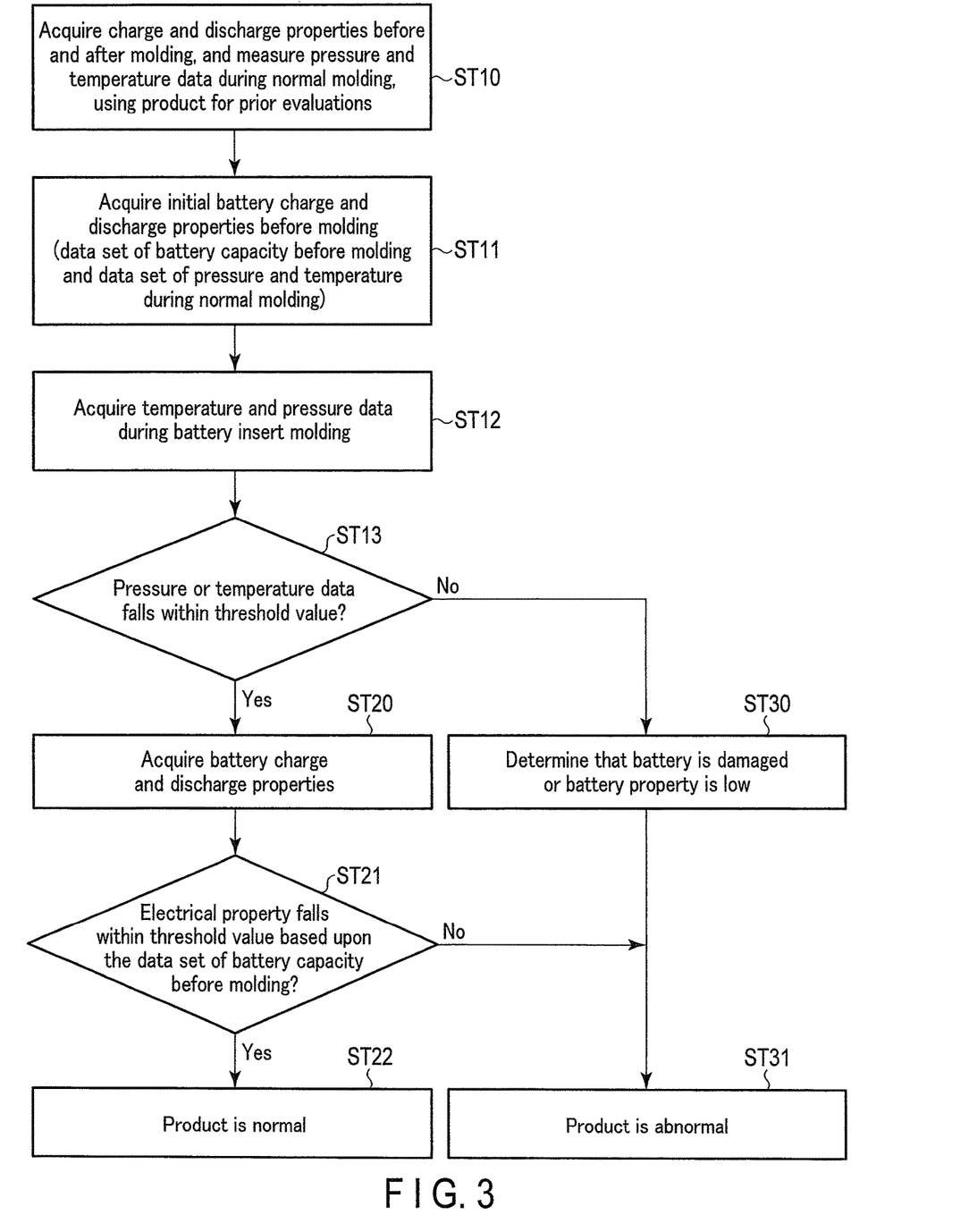
FIG. 3 is a flowchart showing a process of the insert molding quality determination system.

FIGS. 1-3 show a first embodiment of the present invention. FIGS. 1 and 2 illustrate an insert molding quality determination system 10 and an insert molding 20. FIG. 3 is a flowchart showing a process of the insert molding quality determination system 10.

As shown in FIG. 1, the insert molding quality determination system 10 includes an insert molding 20 and a system controller 100. The insert molding 20 includes a substrate 21, a lithium-ion battery (insert component) 30 of a secondary battery and an electronic component 40, which are mounted on the substrate 21.

A temperature measurement element (sensor) 50 and a pressure measurement element (sensor) 60 are arranged around the lithium-ion battery 30 as sensors that sense physical properties such as temperature and pressure, which are applied to the lithium-ion battery 30 of an insert component during insert molding. The output of the temperature measurement element 50 is connected to the electronic component 40 through a lead 51 and supplied with a temperature sensing signal. The output of the pressure measurement element 60 is connected to the electronic component 40 through a lead 61 and supplied with a pressure measurement signal. As is evident from the foregoing descriptions, the output signals of the temperature measurement element (sensor) 50 and the pressure measurement element (sensor) 60 are not directly supplied to the lithium-ion battery 30.

As illustrated in FIGS. 1 and 2, the lithium-ion battery 30 is covered with a cover member 70 such as laminated aluminum foil, and the cover member 70 is bonded to the substrate 21. The cover member 70 is provided to prevent the lithium-ion battery 30 from being degraded due to a high-temperature resin. The normal operation guaranteed temperature of the lithium-ion battery 30 is, for example, 60° C.

The electronic component 40 is, for example, a clock and a GPS driven by the lithium-ion battery 30, and includes a communication controller 41 that performs wireless communication to an external device.

In the insert molding quality determination system 10, the communication controller 41 supplies the system controller 100 with data sensed by the temperature measurement element (sensor) 50 and the pressure measurement element (sensor) 60.

The top of the substrate 21 is covered with a molding resin 80 and sealed with the foregoing lithium-ion battery 30, electronic component 40, temperature measurement element 50, pressure measurement element 60 and cover member 70 integrally as one unit. The molding resin 80 is a flexible material and can be applied to a watch, a wearable device and the like. In addition, the molding resin 80 has such specifications that it can be applied to a low-profile electronic device and the like.

The system controller 100 includes a CPU 101 that controls each component in accordance with a predetermine program. The CPU 101 includes a communication controller 102 that performs wireless communication with the insert molding 20, a sensing signal input unit 103 that is supplied with a sensing signal SR, which is sensed by the sensors 50 and 60 during molding, through the communication controller 102, a measurement unit 104 that measures a first electrical property Q1 before an insert component is resin-molded and a second electrical property Q2 after it is resin-molded, an electrical property storage unit 105 that stores the first electrical property Q1 measured by the measurement unit 104, and a normal-operation sensing signal storage unit 106 that stores a reference sensing signal SS during normal resin molding in the sensors. The first and second electrical properties Q1 and Q2 are, for example, battery charge and discharge properties.

The CPU 101 includes a first determination unit that compares the reference sensing signal SS and the sensing signal SR after the resin molding to determine whether the resin molding is normal or abnormal and a second determination unit that compares the first electrical property Q1 stored in the electrical property storage unit 105 and the second electrical property Q2 measured by the measurement unit 104 after the resin molding to determine whether the resin molding is normal or abnormal.

A process of determining the quality of the insert molding 20 in the insert molding quality determination system 10 so configured, will be described with reference to the flowchart shown in FIG. 3.

First, a temperature sensing signal T0 and a pressure measurement signal P0 in the case where molding has normally been performed, are measured using a product (insert molding) for prior evaluations and stored in the normal-operation sensing signal storage unit 106 as a reference sensing signal SS (ST10). The determination as to whether the molding is normal or abnormal is made by separating the insert molding into parts and confirming whether the parts are arranged in normal positions.

Then, the charge and discharge properties of the insert molding 20 of the actual product are acquired and stored in the electrical property storage unit 105 as the first electrical property Q1. After that, the reference sensing signal SS acquired in ST10 is read in the CPU 101 (ST11).

As shown in FIG. 2, a mold K is set in the insert molding 20 of the actual product. Then, resin (whose temperature is, e.g. about 150° C.) is poured from a hole Ka and at this time a temperature sensing signal T1 and a pressure measurement signal P1 are measured as sensing signals SR (ST12). The temperature sensing signal T1 and pressure measurement signal P1 are input to the CPU 101 and compared with the temperature sensing signal T0 and pressure measurement signal P0. The CPU 101 then determines whether the temperature sensing signal T1 and pressure measurement signal P1 fall within a predetermined range (threshold value) based upon the temperature sensing signal T0 and pressure measurement signal P0 (ST13). If they fall within the threshold value, the CPU 101 determines the insert molding as a normal one and the flow moves to ST20. If they do not fall within the threshold value, the CPU 101 determines the insert molding as an abnormal one and the flow moves to ST30.

Figure 4:
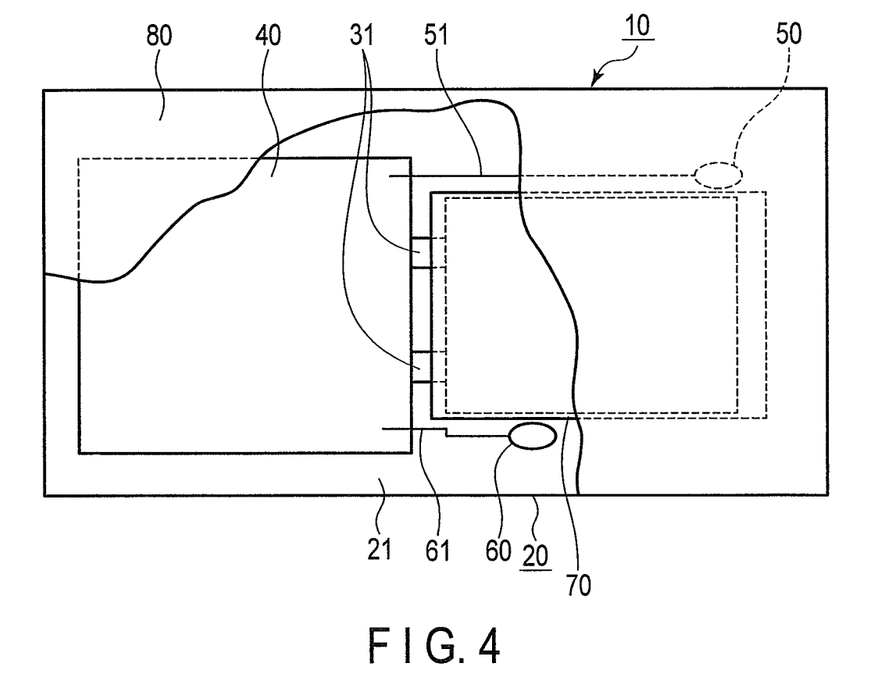
FIG. 4 is a partially cutaway plan view showing an example of the insert molding (during normal operation).
Figure 5:
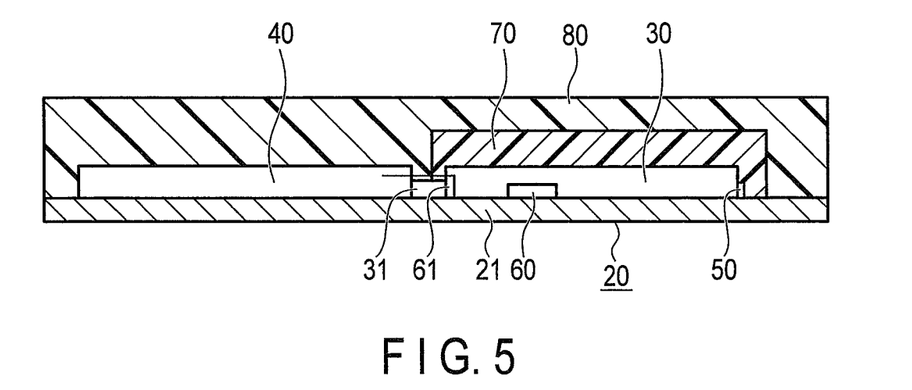
FIG. 5 is a longitudinal sectional view showing the example of the insert molding (during normal operation).
Figure 6:
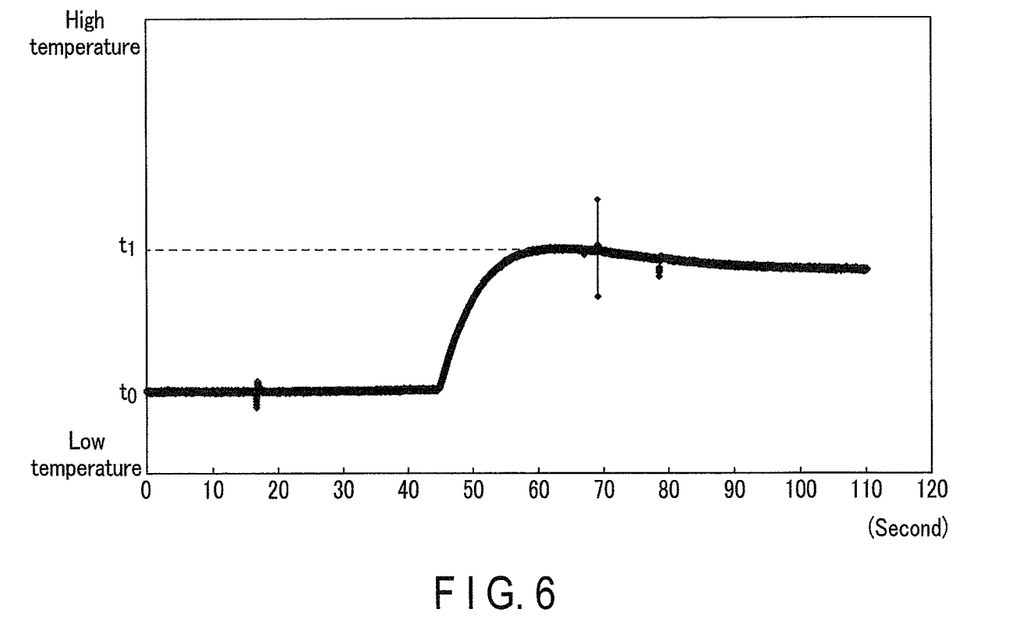
FIG. 6 is a graph showing temperature variations in the example of the insert molding (during normal operation).
Figure 7:
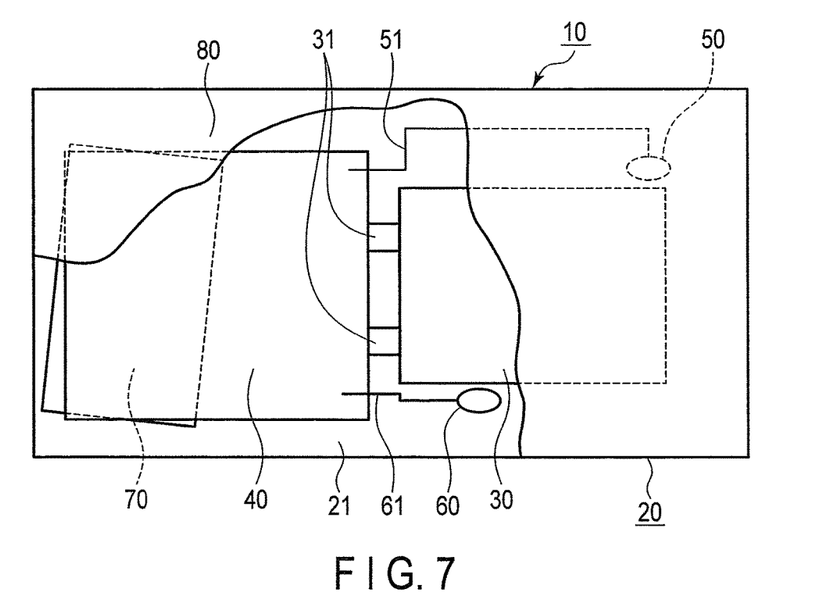
FIG. 7 is a partially cutaway plan view showing an example of the insert molding (during abnormal operation).
Figure 8:
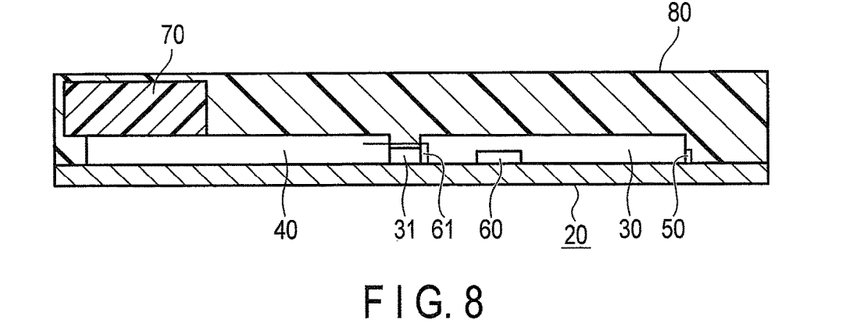
FIG. 8 is a longitudinal sectional view showing the example of the insert molding (during abnormal operation).
Figure 9:
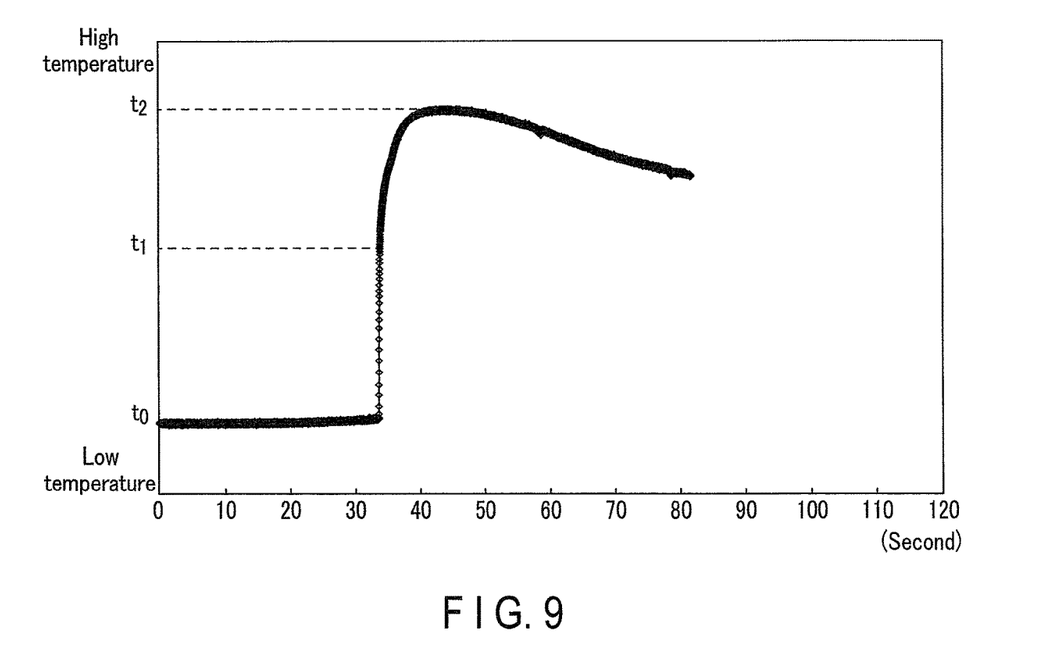
FIG. 9 is a graph showing temperature variations in the example of the insert molding (during abnormal operation).

As the principle of the above determination, the behavior of the cover member 70 is observed based upon externally measured values during resin injection molding. Specifically, when the cover member 70 is not detached (see FIGS. 4 and 5), it insulates the mold from heat and thus the temperature sensing signal T1 is maintained to have a temperature of t1 (60° C.) or lower as shown in FIG. 6. On the other hand, when the cover member 70 is detached (see FIGS. 7 and 8), the mold is exposed to resin of about 150° C. and heated to t2 (120° C.) or higher. Therefore, when the temperature sensing signal T0 exceeds a given temperature of, e.g. t2 (120° C.) as shown in FIG. 9, the CPU 101 determines that abnormality has occurred.

Though a detailed description is not given, when the cover member 70 is not detached (see FIGS. 4 and 5), it protects the mold and thus the pressure measurement signal P1 is maintained within a given pressure range. On the other hand, when the cover member 70 is detached (see FIGS. 7 and 8), the pressure measurement signal P1 exceeds the given pressure range and the CPU 101 determines that abnormality has occurred.

Next, battery charge and discharge properties are acquired as the second electrical property Q2 in ST20. Then, the CPU 101 determines whether the second electrical property Q2 falls within a predetermined range (threshold value) based upon the first electrical property Q1 (ST21). When the second electrical property Q2 falls within the threshold value, the CPU 101 determines the insert molding as a normal one and the flow moves to ST22, in which the insert molding is recognized as a product. When it does not fall within the threshold value, the CPU 101 determines the insert molding as an abnormal one and the flow moves to ST31, in which the insert molding is not recognized as a product. The reason why charge and discharge measurements are made though the CPU 101 does not determine that the cover member 70 is detached is that an unexpected malfunction is assumed.

On the other hand, when the flow moves to ST30, the CPU 101 determines that the insert molding is damaged, without measuring charge and discharge properties, due to abnormal temperature and abnormal pressure.

As described above, according to the insert molding quality determination system 10 of the first embodiment, when the lithium-ion battery 30 that is a heat-sensitive insert component is insert-molded, the quality of the product can be determined even though it cannot be determined from the outside of the product. If the sensors have sensed that the product has received abnormal temperature and abnormal pressure from resin, it can be determined as a defective one and prevented from being shipped erroneously. In the battery insert molding, therefore, the property deterioration and damage in the interior of a battery can be sensed. It is thus possible to assure the safety and quality of products.

Note that the accuracy with which abnormality determination is made can be improved by providing a plurality of temperature measurement elements 50 and a plurality of pressure measurement elements 60. Furthermore, a force vector can be used in which a force sensor capable of sensing forces in x, y and z directions as well as the temperature measurement elements and pressure measurement elements is used as a sensor that measures physical properties.

In the foregoing embodiment, data sensed by the temperature measurement element (sensor) 50 and pressure measurement element (sensor) 60 is transmitted to the system controller 100 by wireless communication. However, for example, a USE terminal can be provided at the insert molding 20 such that it is open to the outside, thereby transmitting sensing data to the system controller 100 by wire communication.

In the foregoing embodiment, furthermore, the sensing signal SR is a signal to be sensed by a sensor during molding. However, it may be a signal to be sensed by a sensor after molding, which depends on the sensor.

In the foregoing embodiment, furthermore, the system controller 100 determines the quality of the insert molding 20. Instead of the system controller 100, the electronic component 40 of the insert molding 20 may make the determination and transmit a result of the determination to an external device.

Note that the present invention is not limited to the foregoing embodiment. In the foregoing embodiment, the lithium-ion battery is exemplified as an insert molding. Of course, the present invention can also be applied to an organic EL device, an electronic device bonded by an anisotropic conductive film, etc. as a device that is sensitive to heat.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An insert molding quality determination device that determines quality of an insert component after the insert component is resin-molded, the insert molding quality determination device comprising:
    a sensing signal input unit that is supplied with a sensing signal from a sensor disposed close to the insert component that is a quality determination target, to sense a state around the insert component during resin molding;
    a first determination unit that is configured to perform, after the resin molding, a first determination to determine whether the resin molding is normal or abnormal based on the sensing signal;
    a measurement unit that is configured to measure a first electrical property of the insert component, which is the quality determination target, before the resin molding of the insert component and that measures a second electrical property of the insert component after the resin molding;
    an electrical property storage unit that stores the first electrical property measured by the measurement unit; and
    a second determination unit that is configured to perform a second determination to determine whether the resin molding is normal or abnormal by comparing the first electrical property stored in the electrical property storage unit and the second electrical property measured by the measurement unit after resin molding and making the second determination based on a result of the comparison,
    wherein the sensing signal supplied to the sensing signal input unit and that is used in the first determination by the first determination unit indicates information that is different from the first electrical property and the second electrical property that are measured by the measuring unit and that are used in the second determination by the second determination unit.

2. The insert molding quality determination device according to claim 1, further comprising a normal-operation sensing signal storage unit that stores a reference sensing signal during normal resin molding in the sensor, wherein the first determination unit compares the reference sensing signal and the sensing signal after the resin molding to determine whether the resin molding is normal or abnormal.

3. The insert molding quality determination device according to claim 1, wherein the insert component is a battery.

4. The insert molding quality determination device according to claim 1, wherein the sensor includes a temperature measurement element.

5. The insert molding quality determination device according to claim 1, wherein the sensor includes a pressure measurement element.

6. The insert molding quality determination device according to claim 3, wherein:
    the first electrical property is a charge and discharge property of the battery before the resin molding, and
    the second electrical property is a charge and discharge property of the battery after the resin molding.

7. A method for determining quality of an insert component after the insert component is resin-molded using the insert molding quality determination device of claim 1, the method comprising:
    receiving, by the sensing signal input unit, a sensing signal from a sensor disposed close to the insert component that is a quality determination target, to sense a state around the insert component during resin molding; and
    performing, by the first determination unit, a first determination to determine whether the resin molding is normal or abnormal based on the sensing signal, wherein the first determination is performed after the resin molding;
    measuring, by the measurement unit, a first electrical property of the insert component, which is the quality determination target, before the resin molding of the insert component, and measuring a second electrical property of the insert component after the resin molding;
    storing the first electrical property in the electrical property storage unit; and
    comparing the first electrical property stored in the electrical property storage unit and the second electrical property measured after the resin molding, and performing, by the second determination unit, a second determination to determine whether the resin molding is normal or abnormal based on a result of the comparison,
    wherein the sensing signal that is used in the first determination indicates information that is different from the first electrical property and the second electrical property that are used in the second determination.

8. A non-transitory computer-readable storage medium storing a program executable by a processor of the insert molding quality determination device of claim 1, the insert molding quality determination device determining quality of an insert component after the insert component is resin-molded, wherein the program is executable by the processor to cause the processor to perform functions comprising:
    a sensing signal input process of receiving, by the sensing signal input unit, a sensing signal from a sensor disposed close to the insert component that is a quality determination target, to sense a state around the insert component during resin molding;
    a first determination process of performing, as the first determination unit, a first determination to determine whether the resin molding is normal or abnormal based on the sensing signal;

a measurement process of measuring, by the measurement unit, a first electrical property of the insert component, which is the quality determination target, before the resin molding of the insert component, and measuring a second electrical property of the insert component after the resin molding;

an electrical property storage process of storing the first electrical property in the electrical property storage unit; and a second determination process of comparing the first electrical property stored in the electrical property storage unit and the second electrical property measured after the resin molding, and performing, as the second determination unit, a second determination to determine whether the resin molding is normal or abnormal based on a result of the comparison, wherein the sensing signal that is used in the first determination by the first determination process indicates information that is different from the first electrical property and the second electrical property that are used in the second determination by the second determination process.

\* \* \* \* \*